(12) United States Patent
Nsame et al.

(10) Patent No.: US 7,765,351 B2
(45) Date of Patent: Jul. 27, 2010

(54) HIGH BANDWIDTH LOW-LATENCY SEMAPHORE MAPPED PROTOCOL (SMP) FOR MULTI-CORE SYSTEMS ON CHIPS

(75) Inventors: Pascal A. Nsame, Colchester, VT (US); Anthony D. Polson, Jericho, VT (US); Nancy H. Pratt, Essex Junction, VT (US); Sebastian T. Ventrone, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/684,687

(22) Filed: Mar. 12, 2007

(65) Prior Publication Data

US 2008/0229006 A1    Sep. 18, 2008

(51) Int. Cl.
*G06F 12/00*    (2006.01)
(52) U.S. Cl. ............... 710/244; 710/260; 710/240; 710/200; 711/170
(58) Field of Classification Search ......... 710/240–244, 710/260–269, 107, 200; 711/151, 170
See application file for complete search history.

(56) References Cited

U.S. PATENT DOCUMENTS

| | | | |
|---|---|---|---|
| 6,965,991 | B1 | 11/2005 | Marchand et al. |
| 6,970,962 | B2 | 11/2005 | Dieffenderfer et al. |
| 7,054,970 | B2 | 5/2006 | Kim |
| 2002/0073259 | A1* | 6/2002 | Grisenthwaite ............. 710/107 |
| 2003/0208566 | A1 | 11/2003 | Weber et al. |
| 2004/0019722 | A1 | 1/2004 | Sedmak |
| 2005/0021871 | A1 | 1/2005 | Georgiou et al. |
| 2005/0177664 | A1 | 8/2005 | Cho et al. |
| 2006/0129729 | A1 | 6/2006 | Yuan et al. |

OTHER PUBLICATIONS

Jorg Henkel, Wayne Wolf, Srimat Chakradhar, "On-Chip Networks: A Scalable, Communication-Centric Embedded System Design Paradigm," VLSI Design, 2004. Proceedings of the 17th International Conference, pp. 845-851.

Cristian Grecu, Partha Pratim Pande, Andre Ivanov, Res Saleh, "A Scalable Communication-Centric SoC Interconnect Architecture," Quality Electronic Design, 2004. Proceedings of the 5th International Symposium, pp. 343-348.

(Continued)

*Primary Examiner*—Ryan M Stiglic
*Assistant Examiner*—Kim T Huynh
(74) *Attorney, Agent, or Firm*—Downs Rachlin Martin PLLC (57) ABSTRACT

A system and method for dynamically managing movement of semaphore data within the system. The system includes, but is no limited to, a plurality of functional units communicating over the network, a memory device communication with the plurality of functional units over the network, and at least one semaphore storage unit communicating with the plurality of functional unites and the memory device over the network. The plurality of functional units include a plurality of functional unit memory locations. The memory device includes a plurality of memory device memory locations. The at least one semaphore storage unit includes a plurality of semaphore storage unit memory locations. The at least one semaphore storage unit controls dynamic movement of the semaphore data among the plurality of functional unit memory locations, the plurality of memory device memory locations, the plurality of semaphore storage unit memory locations, and any combinations therof.

20 Claims, 7 Drawing Sheets

OTHER PUBLICATIONS

Kenichiro Anjo, Atsushi Okamura, Tomoharu Kajiwara, Noriko Mizushima, Masafumi Omori, Yasuaki Kuroda, "NECoBus: A High-End SOC Bus With a Portable & Low-Latency Wrapper-Based Interface Mechanism," Custom Integrated Circuits Conference, 2002. Proceedings of the IEEE, May 12-15, 2002, pp. 315-318.

* cited by examiner

HIGH BANDWIDTH LOW-LATENCY SEMAPHORE MAPPED PROTOCOL (SMP) FOR MULTI-CORE SYSTEMS ON CHIPS

FIELD OF THE INVENTION

The present invention generally relates to the field of integrated chips. In particular, the present invention is directed to a high-bandwidth low-latency semaphore mapped protocol (SMP) for multi-core system-on-chips.

BACKGROUND OF THE INVENTION

Recent trends in the computer industry, including dramatic slowing of silicon technology scaling, exhaustion of conventional micro-architecture techniques, and growing prevalence of functions (e.g., integrated processor (IP) cores) requiring substantial computation of a particular type, are combining to make certain design integration approaches, such as multi-core implementations, increasingly attractive for application to system-on-chip (SOC), or system-on-a-chip products.

Conventional inter-processor communication in a shared-memory multiprocessor is generally carried out using a cache coherence protocol that enables the correct sharing of data among multiple processors. Conventional techniques allow functional units, such as IP cores, to communicate via local memory and/or a register file system interconnected over a standard bus. However, these conventional techniques lack communication mechanisms and protocol to handle communication needs for multi-core implementations resulting in large reductions in average communication latency and at the cost of protocols and systems that are too complex to be feasible. As a result, multi-core implementations using conventional techniques exhibit a large overhead for required communication traffic.

Other techniques make use of speculative execution to hide the long latencies, i.e., control speculation, dependence speculation, speculative parallelization, speculative lock elision, and coherence decoupling.

A semaphore may be used to manage access to a shared resource in a given system. Conventionally, semaphore locations are static and fixed in hardware under software control. Semaphore locations are often accessed by master and/or slave devices with on-chip network ports that implement point-to-point or multi-point protocols between processors and interrupt enable memory-map devices connected via a hierarchy of dedicated universal interrupt controllers (UIC). Such mechanisms tend to be somewhat non-deterministic with respect to response time, and are often not flexible or scalable for evolving SOC functionality.

Further, conventional static semaphore multi-core systems can suffer from multi-threaded task overhead due to communication latency, context switching, and cold cache effects. Furthermore, conventional static semaphore locations suffer from the fact that once the design is implemented in silicon, new software may no longer run in an optimum manner.

Semaphores are conventionally known in the art for controlling access to shared resources in systems wherein a plurality of execution units, such as processing units and hardware engines, each require access to a shared resource. The shared resource is typically a memory space for storing information which may include a single bit of data, a byte, or a large data structure. The shared resources could also be the processing resources of a processing unit. However, in multiprocessor systems, existing semaphore techniques are implemented at the main memory level. However, when semaphores are so implemented, caches used in the main memory may start to break down, which adversely affects processing efficiency.

Thus, there is a need in the art for efficient, high-bandwidth, and low-latency communication mechanisms between functional units on the same chip, without complicating the underlying coherence protocol that guarantees correctness

SUMMARY OF THE INVENTION

In one aspect of the present disclosure, a system for managing semaphore data is provided. The system includes a network; a plurality of functional units communicating over the network, the plurality of functional units including a plurality of functional unit memory locations; a memory device communicating with the plurality of functional units over the network, the memory device including a plurality of memory locations; and at least one semaphore storage unit communicating with the plurality of functional units and the memory device over the network. The at least one semaphore storage unit controls dynamic movement of the semaphore data among the plurality of functional unit memory locations in the plurality of functional units and the plurality of memory locations in the memory device.

In another aspect of the present disclosure, a semaphore storage unit dynamically controlling a location of semaphore data within a system for managing semaphore data is provided. The semaphore data is accessible by a plurality of functional units of the system. The semaphore storage unit includes a programmable processor interface interfacing with the plurality of functional units of the system; a memory device; a memory controller controlling the memory device; a programmable on-chip network interface interfacing with a network of the system; and a semaphore controller dynamically controlling the location of the semaphore data within the system.

In yet another aspect of the present disclosure a method of dynamically positioning semaphore data in a system for managing semaphore data for sharing by a plurality of functional units of the system is provided. The system including a semaphore storage unit, a plurality of programmable memory locations, and a network over which the plurality of functional units can communicate with the plurality of programmable memory locations, the network including a communications channel that supports communication of semaphore data between the plurality of functional units and the plurality of programmable memory locations over the network. The method including the steps of: receiving application requirements at the semaphore storage unit, the application requirements including a set of communication primitives for each traffic scenario between the plurality of functional units; programming the communications channel based on the application requirements to support communication of semaphore data between the plurality of functional units over the network; selecting at least one of the plurality of programmable memory locations to receive semaphore data based on the application requirements; associating the application requirements and the programmable memory locations with the required communication primitives to produce a complex message from semaphore data; and sending the complex message to at least one functional unit over the communications channel of the network according to the application requirements.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION

Semaphores may manage access to a shared resource in a multiprocessing environment. Semaphore locations in conventional multiprocessing environments are conventionally static and fixed in hardware under software control. The present disclosure provides a method and a system for a programmable dynamic semaphore location with a flexible, scalable, and real-time message passing interface for on-demand and real-time signaling between peer functional units while preserving synchronization, coherency, and consistency.

Figure 1:
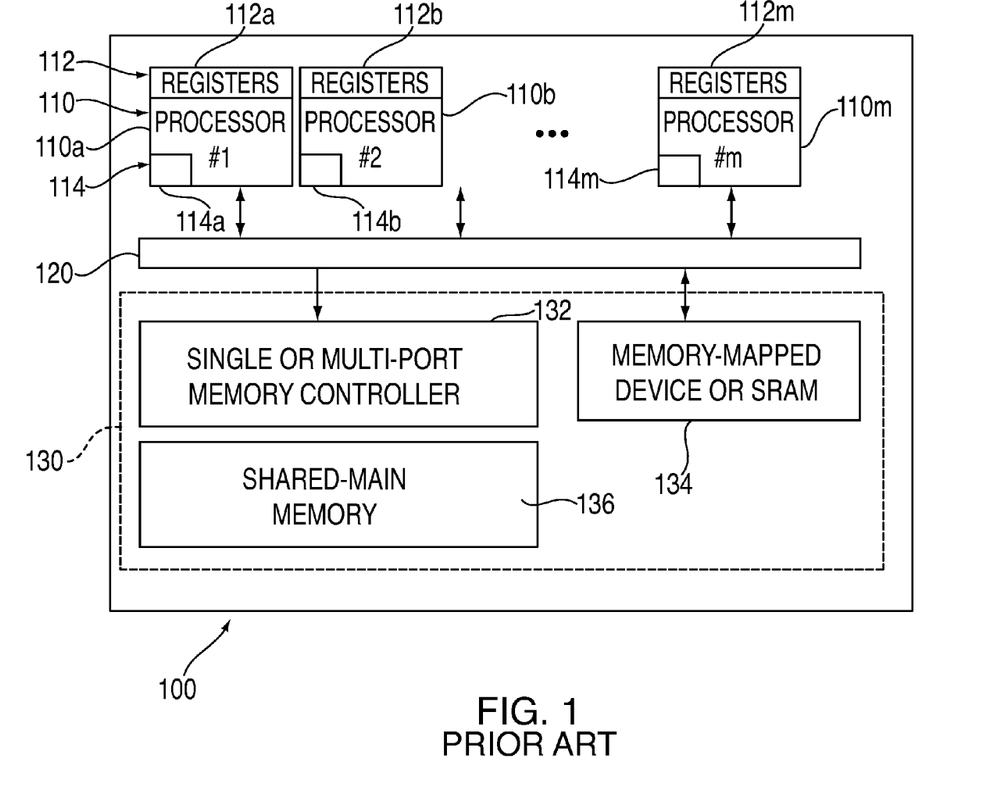
FIG. 1 illustrates a block diagram of a conventional multi-processor static semaphore management system.

Referring now to FIG. 1, a conventional multi-functional unit static semaphore management system 100 is illustrated. System 100 may include a fixed location for semaphore data. At a high level, system 100 includes a plurality of functional units 110 such as processors or IP cores, a bus 120, and a memory device 130.

Functional units 110 are illustrated as first functional unit 110a, second function unit 110b, and $m^{th}$ functional unit 110m, where 'm' represents a variable number for the number of functional units. Functional units 110 may also have a register 112 that serves as a local storage area within the functional unit for holding data that may be worked on by the functional unit, and a cache 114. In some cases cache 114 may be considered part of functional unit 110.

Bus 120 may include a standard bus or switch for connecting plurality of functional units 110 to memory device 130 for allowing communications between the functional units and the memory device. Bus 120 may include an on-chip bus arbiter (not shown) for helping manage access to the static semaphore data location.

Memory device 130 may include a memory controller 132 such as a single or multi-port memory controller, a memory-mapped device 134 such as a SRAM, and a shared-main memory device 136.

System 100 may statically store semaphore data, a shared resource for devices of the system, at a fixed location. Locations for the static semaphore data may include: registers 112, cache 114, memory-mapped device 134, or shared main memory device 136. In this illustrative embodiment of FIG. 1, semaphore data is fixed and cannot be dynamically moved. Consequently, the fixed location of semaphore data may be optimal for certain operations and applications, but highly inefficient for other operations and applications.

Figure 2:
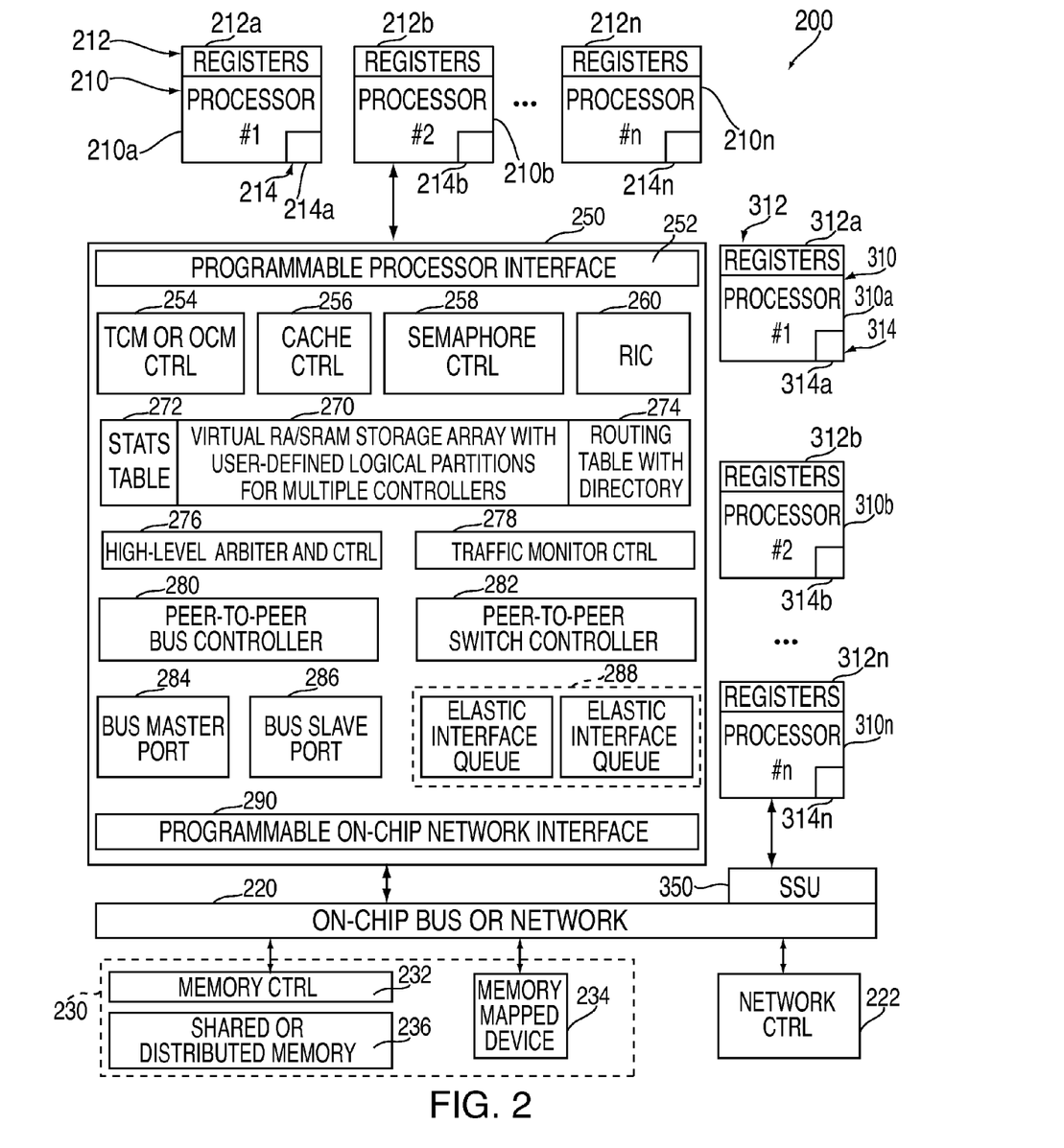
FIG. 2 illustrates a semaphore data management system in accordance with an embodiment of the present disclosure.

FIG. 2 illustrates a semaphore data management system 200 in accordance with an embodiment of the present disclosure. At a high level, system 200 includes, among other things, a first group of functional units 210, a network 220, a memory device 230, a first semaphore storage unit (SSU) 250, a second group of functional units 310, and a second SSU 350. First and second SSUs 250, 350 may dynamically control or move semaphore data to one or more natural semaphore locations within devices of system 200, as explained in greater detail below. It should also be noted that the present disclosure contemplates components and devices of system 200 residing on an integrated circuit chip (not shown), such as but not limited to, first group of functional units 210, network 220, memory device 230, first SSU 250, second group of functional units 310, and second SSU 350.

First group of functional units 210 and second group of functional units 310 may include, but are not limited to, processors or IP cores for performing operations and running programs for system 200. First group of functional units 210 are illustrated as first functional unit 210a, second functional unit 210b, and $n^{th}$ functional unit 210n, where 'n' denotes a variable number for the number of functional units in system 200. The range for 'n' may be, but not limited to, in the range of 2 to 1024, but will depend on the requirements for system 200 and so other ranges are encompassed by the present disclosure. Likewise, second group of functional units 310 are illustrated as first functional unit 310a, second functional unit 310b, and $n^{th}$ functional unit 310n. First group and second group of functional units 210, 310 may be arranged in a device control register (DCR) ring topology for allowing transfer of data between the functional units of each DCR ring.

First and second groups of functional units 210, 310 may each have a plurality of functional unit memory locations such as, but not limited to, a register 212, 312, and a cache 214, 314, respectively. Registers 212, 312 and cache 214, 314 may each serve as a local storage area within each associated functional unit 210, 310 for holding instructions, data, or values that may be worked on by that functional unit. Thus, first functional unit 210a has first register 212a and first cache 214a; second functional unit 210b has second register 212b and second cache 214b; and $n^{th}$ functional unit 210n has $n^{th}$ register 212n and $n^{th}$ cache 214n. Likewise first functional unit 310a has first register 312a and first cache 314a; second functional unit 310b has second register 312b and second cache 314b; and $n^{th}$ functional unit 310n has $n^{th}$ register 312n and $n^{th}$ cache 314n.

Network 220 may include reusable, flexible, and scalable communication channels arranged to connect to functional units and other on-chip networks of system 200. Network 220 may also be referred to as a bus and may support the exchange of messages and data between the devices of system 200. The flow of communications between the devices of system 200 over network 220 may be controlled by a network controller 222. Network 220 may include any on-chip network and protocol allowing communications between the devices.

Memory device 230 may include a memory controller 232 such as a single or multi-port memory controller, and a plurality of memory locations such as, but not limited to, a memory-mapped device 234 such as a SRAM device, and a shared or distributed main memory device 236. Memory controller 232 may control and manage memory-mapped device 234, main memory device 236, and any other memory device of system 200.

First and second SSUs 250 and 350 may include reusable and programmable storage functions and may create preemption on peer functional units, e.g., functional units 210*a* and 210*b*, for communicating and delivering real-time complex messages between the functional units and memory device 230. Complex message are discussed further in association with FIG. 4. First and second SSUs 250 and 350 may enable virtualization and may sit as a slave and/or master on a bus system and/or point-to-point port on a switch, for enabling each functional unit write and read access. Put another way, storage virtualization may create logical abstractions of physical storage systems for simplifying storage administration and reducing costs for managing diverse storage assets. First SSU 250 is similar to second SSU 350 and may generally include the same components and devices, and will usually operate in a substantially similar manner. Thus, the discussion of the components and functionality of first SSU 250 that follows, is also generally applicable to second SSU 350. In some cases it will be desirable to include third, fourth, fifth, or even more SSUs.

First and second SSUs 250, 350 may include logic designed to handle interface and protocol translation requirements that make the SSU flexible and reusable across multiple applications and/or multiple processor instantiations within the same application while offloading CPUs from all setup, configuration, and transfer-related traffic. The present disclosure also contemplates the use of scalable global memory with a number functional units or processors while providing deterministic access latencies and performance.

At a high level SSUs 250 may have, among other things, a programmable processor interface 252, a memory device controller 254, a cache controller 256, a semaphore controller 258, a real-time interruptible controller (RIC) 260, a virtual storage array 270, a high-level arbiter and controller 276, a traffic monitor controller 278, a peer-to-peer bus controller 280, a peer-to-peer switch controller 282, a bus master port 284, a bus slave port 286, an elastic interface queue 288, and a programmable on-chip network interface 290. It should be noted that a person of ordinary skill in the art would readily appreciate that SSU 350 may include substantially similar devices and controllers as SSU 250 but are not provided in the illustrative embodiment of FIG. 2.

Programmable processor interface 252 may enable SSU 250 to communicate with functional units of system 200 such as first set of functional units 210 and second set of functional units 310. Additionally, programmable processor interface 252 may enable SSU 250 to communicate with other devices of system 200, such as memory device 230 and SSU 350. As will be readily appreciated by one of ordinary skill in the art, programmable processor interface 252 may include, but is not limited to, a 32/64/128/256/512 bit interface configuration for communications between all types of functional units and devices of system 200.

Memory device controller 254 may control access to memory devices of SSU 250 and system 100. Memory devices may include, but are not limited to, a tightly-coupled memory (TCM) in a dedicated local memory, an on-chip memory (OCM) in a secured local memory, and any combinations thereof.

Cache controller 256 may provide logic to manage data in cache 214 and 314.

Semaphore controller 258 may provide logic for managing and controlling the location of semaphore data to the most natural semaphore location within system 200. Semaphore controller 258 is discussed in greater detail below in association with FIG. 3.

Real-time interruptible controller (RIC) 260 may provide logic for managing interruptions of functional units accessing the natural semaphore location. RIC 260 may be addressable for a real-time communications protocol. Several addressable interrupts levels may be used to implement a priority-based preemption scheme with support for full broadcast, semi-broadcast, and individual interrupt signaling via RIC 260.

Virtual storage array 270 may include, among other things, a RAM (not shown), a SRAM (not shown), a stats table 272 and a routing table 274 for data storage for natural semaphore locations. Virtual storage array 270 may also include user-defined logical partitions for multiple controllers. Stats table 272 may provide logic to store statistics collected by traffic monitor controller 278. Routing table 274 may provide logic to store application specific network configurations for determining the communication channel with the lowest latency, highest bandwidth, and highest availability/serviceability. Routing table 274 may be updated with a broadcast complex message to all SSUs of system 200 after a change in semaphore location occurs. The size and number of clusters in routing table 274 may be driven by application requirements.

High-level arbiter controller 276 may include logic to manage access to the shared resources of SSU 250 when multiple applications are running concurrently in system 200, such as with a sea of functional units or processors. High-level arbiter controller 276 may control access to statistics table 272 and semaphore routing table 274.

Traffic monitor controller 278 may include logic to manage statistics collected from real-time traffic across SSU 250 for regulating traffic per channel with a feedback loop. Traffic monitoring may be enabled by maintaining an updated semaphore routing table 274 which includes a list of entries that uniquely identifies each functional unit that has requested access to semaphore data while it was locked or that need to have access to given semaphore data along with average performance metrics associated with that functional unit and its bandwidth requirements. Traffic scenario definitions may also be provided to SSU 250. Traffic scenario definitions, which may be default, preset, or user-defined, identify traffic scenarios that may require changes to the application or program running on system 200.

Peer-to-peer bus controller 280 may enable communications with a plurality of bus topologies. Peer-to-peer bus controller 280 may have logic to manage access to a shared on-chip bus or other suitable buses, such as an IBM Processor Local Bus or CoreConnect™ architecture. IBM's CoreConnect™ bus architecture provides a 32-, 64-, 128-bit core on-chip bus structure, that eases the integration and reuse of a processor, a system, and peripheral cores within standard product and custom SOC designs. The CoreConnect™ bus architecture allows engineers to assemble custom SOC designs using cores designed to CoreConnect™ specifications. The CoreConnect™ bus architecture is a standard SOC design point, and may serve as a foundation for devices. CoreConnect™ may include (not shown) a processor local bus (PLB), an on-chip peripheral bus (OPB), a bus bridge, and a device control register (DCR) bus. High-performance peripherals may connect to the high-bandwidth, low-latency PLB. Slower peripheral cores may connect to the OPB, which reduces traffic on the PLB, resulting in greater overall system performance.

Peer-to-peer switch controller 282 may include logic to manage access to a shared channel managed by any real-time communications or network protocol, such as HyperTransport protocol discussed in greater detail below.

Bus master port 284 may initiate a request for SSU 250. Bus slave port 286 may respond to a request initiated by bus master port 284.

Elastic interface queue 288 may include a non-blocking bi-directional interface based on any network protocol. For example, such a network protocol may include, but is not limited to, HyperTransport™ protocol. HyperTransport™ interconnect technology is a high-performance, high-speed, high-bandwidth, point-to-point link that provides the lowest possible latency for chip-to-chip and board-to-board links. HyperTransport™ technology provides a flexible, scalable interconnect architecture designed to reduce the number of buses within the system, provides a high-performance link for applications ranging from embedded systems, to personal computers and servers, to network equipment and supercomputers. HyperTransport™ delivers all of these capabilities within a framework that enables designers to develop system architectures free of data processing constraints and performance bottlenecks.

Programmable on-chip network interface 290 may include an interface for communicating with network 220 to communicate with devices of system 200, such as memory device 230 and second SSU 350.

In the illustrative embodiment of FIG. 2, semaphore data may be dynamically moved between a plurality of memory locations of system 200 for global access by each functional unit, such as functional units 210 and 310, to any memory location. For example, semaphore data may dynamically be moved between registers 212, registers 312, memory-mapped device 234, shared or distributed memory 236, virtual storage arrays 270, stats table 272, routing table 274, and any combinations thereof. It should be noted, SSU 350 may also include, but not limited to, a storage array with a stats table and a routing table not shown in FIG. 2. However, the storage array, stats table, and routing table of SSU 350 may also be natural semaphore locations. In other words, natural semaphore locations may include any one or combinations of the aforementioned locations. Natural semaphore locations, for the purposes of this disclosure, are locations within a system, such as system 200, providing the lowest latency and lowest network traffic for a given functional unit or cluster of functional units or processors. Thus, natural semaphore locations may include any location within system 200 capable of holding semaphore data and closest to the device performing a majority or substantial portion of the functions or operations of the program. Each natural semaphore location may be programmed and changed dynamically or on-the-fly by SSUs or a functional unit designated as a master of a given cluster of functional units. For example, natural semaphore location may include a location closest to functional units 212, performing the majority of operations such that semaphore data may be stored in registers 212 or caches 214; closest to memory devices which are accessed frequently during performance of operations such as in memory device 230, storage array 270 of SSU 250, or the storage array (not shown) of SSU 350; closest to the inputs and/or outputs of system 200; and any combinations thereof. Additionally, the natural semaphore location may dynamically move during processing of threads of a program in real time or on-the-fly. For example, the natural semaphore location may be closest to a processor for a duration of a first thread of the program, and then the natural semaphore location may dynamically move to be closer to a memory storage device for the duration of a second thread. The protocol for moving the natural semaphore location of semaphore data is discussed in greater detail below in association with FIGS. 5 and 6.

In one embodiment of the present disclosure, criteria for selecting the natural semaphore location may be determined by a background multi-threaded task running in a small functional unit inside SSU 250 or 350, such as but not limited to semaphore controller 258. The small functional unit monitors the latency and traffic associated with the semaphore location. The code required to program SSU 250 and SSU 350 may reside in a memory device of either SSU, such as a tightly coupled memory, an on-chip memory, virtual storage array 270, and any combinations thereof.

Figure 3:
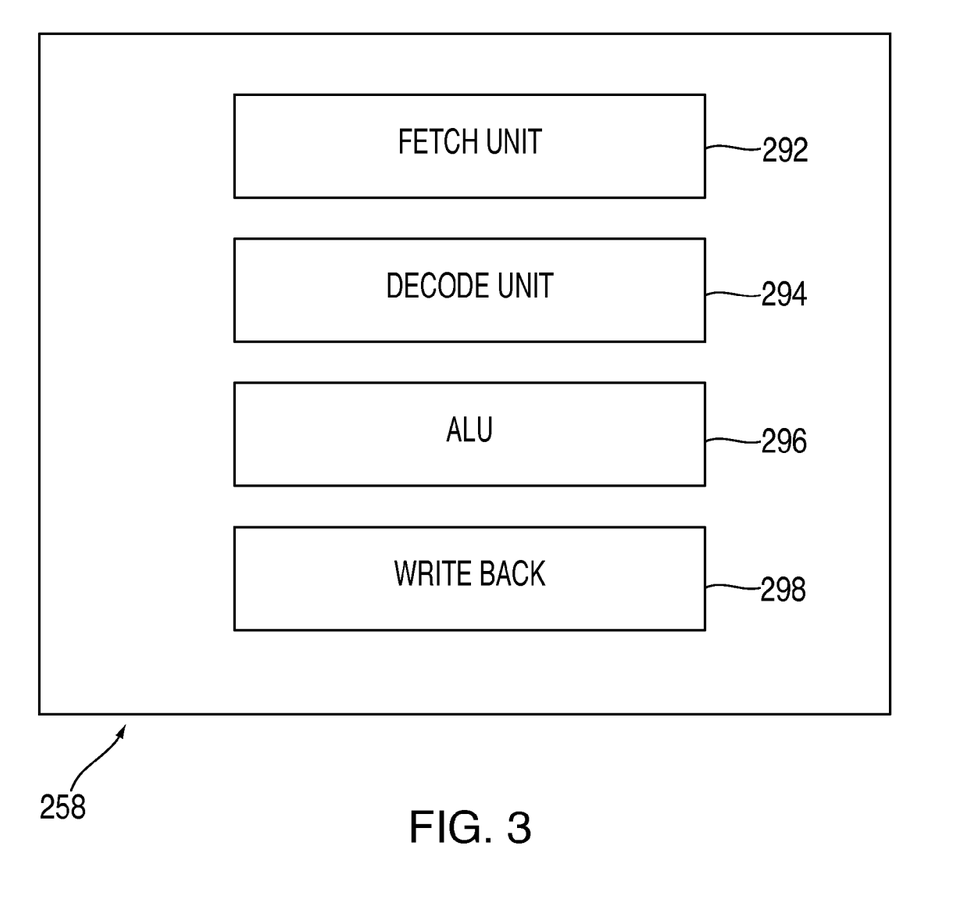
FIG. 3 illustrates an exemplary semaphore logic controller in accordance with another embodiment of the present disclosure.

FIG. 3 illustrates an exemplary semaphore logic controller 258 of SSU 250 with a lightweight processor, for example a lightweight processor containing 10,000 gates, according to an embodiment of the present disclosure. However, it should be noted that other state machines may be utilized for semaphore logic controller 258 while keeping within the scope and spirit of the present disclosure.

Semaphore logic controller 258 may handle interface and protocol translation requirements that make SSU 250 flexible and reusable across multiple applications and/or multiple functional unit instantiations within the same application while offloading CPUs from all setup, configuration, and transfer-related traffic.

Semaphore logic controller 258 performs an instruction from the complex message with a fetch-decode-execute cycle, as well known in the art. Semaphore logic controller 258 includes a fetch unit 292 for fetching the instructions or complex message with semaphore data, a decode unit 294 for decoding the instructions or message with semaphore data from the natural semaphore location, an Arithmetic and Logic Unit (ALU) 296 for executing the instructions or message with semaphore data, and a write back unit 298 for storing in memory, or other location as required by the application, any results generated by the operation or sending any results to an output device, such as a functional unit or processor. Based on a condition feedback from ALU 296, semaphore logic controller 258 may either increment to address the next instruction or update to a different address where the next instruction will be fetched. The process then repeats.

Figure 4:
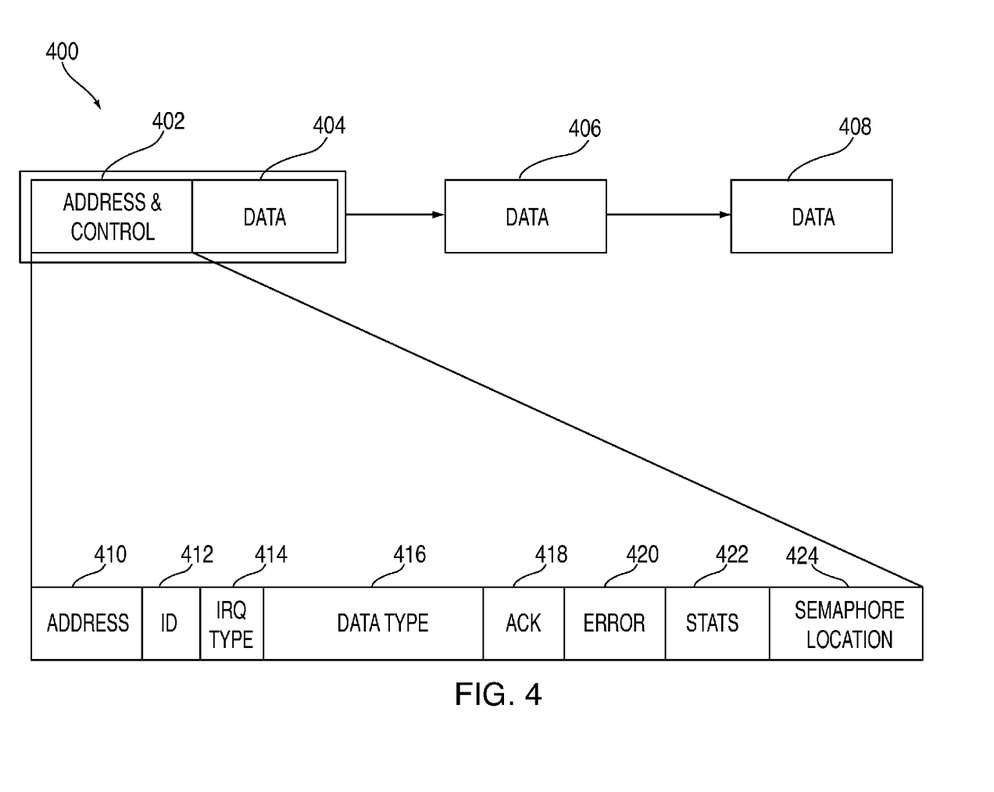
FIG. 4 illustrates a complex message structure for use in semaphore storage units in accordance with an embodiment of the present disclosure.

FIG. 4 illustrates an exemplary complex message 400, in accordance with an embodiment of the present disclosure. Complex message 400 may be sent between devices of system 200, such as between functional units 210, functional units 310, SSU 250, SSU 350, storage array 270, memory device 230, and other programmable storage devices. A shortest valid packet for complex message 400 may include an address and control portion 402 and a first data portion 404. However, the present disclosure contemplates additional data portions. Thus the illustrative embodiment of FIG. 4 provides complex message 400 that may include a second data portion 406 and a third data portion 408. First, second, and third data portions 404-408 may be packet-chained for enabling longer messages and burst transactions. Additionally, address and control portion 402 and data portions 404-408 may be limited by a message bit-type boundary. For example in this illustrative embodiment, address and control portion 402 and data portions 404-408 may have, but are not limited to, a 32-bit boundary in a 32-bit bus system. Each bit in each word may be constructed by a sending SSU with a built-in function such that if the SSU or functional unit initiates a write to this bit location, a pulse is driven out on its corresponding port on receiving a functional unit or processor via a receiving SSU. These pulses may be connected as interrupts to receiving SSU or SSUs. In another example, if four 32-bit words are available on the system bus, a total of 128 bits may be available to a programmer to generate a complex real-time message with no polling and spin lock requirement. The bits included in complex message 400 may be used to provide programmability and scalability required for real-time communication between independent execution units in a sea of functional units or processors. For example, a target data rate, bandwidth, and latency may be specified and maintained by SSUs under a user-defined threshold.

Address and control portion 402 may include an address field 410, an identification field 412, an interrupt request line (IRQ) type field 414, a data-type field 416, an acknowledgement field 418, an error field 420, a stats field 422, and a semaphore location field 424. The number of bits for each field 410-424 may be programmable for improved end-to-end security. Complex messages 400 may be constructed and delivered using protocols, as discussed below in association with FIGS. 5 and 6, without polling or spin-lock in response to scheduled or unscheduled real-time events across entire multi-processor systems.

Figure 5:
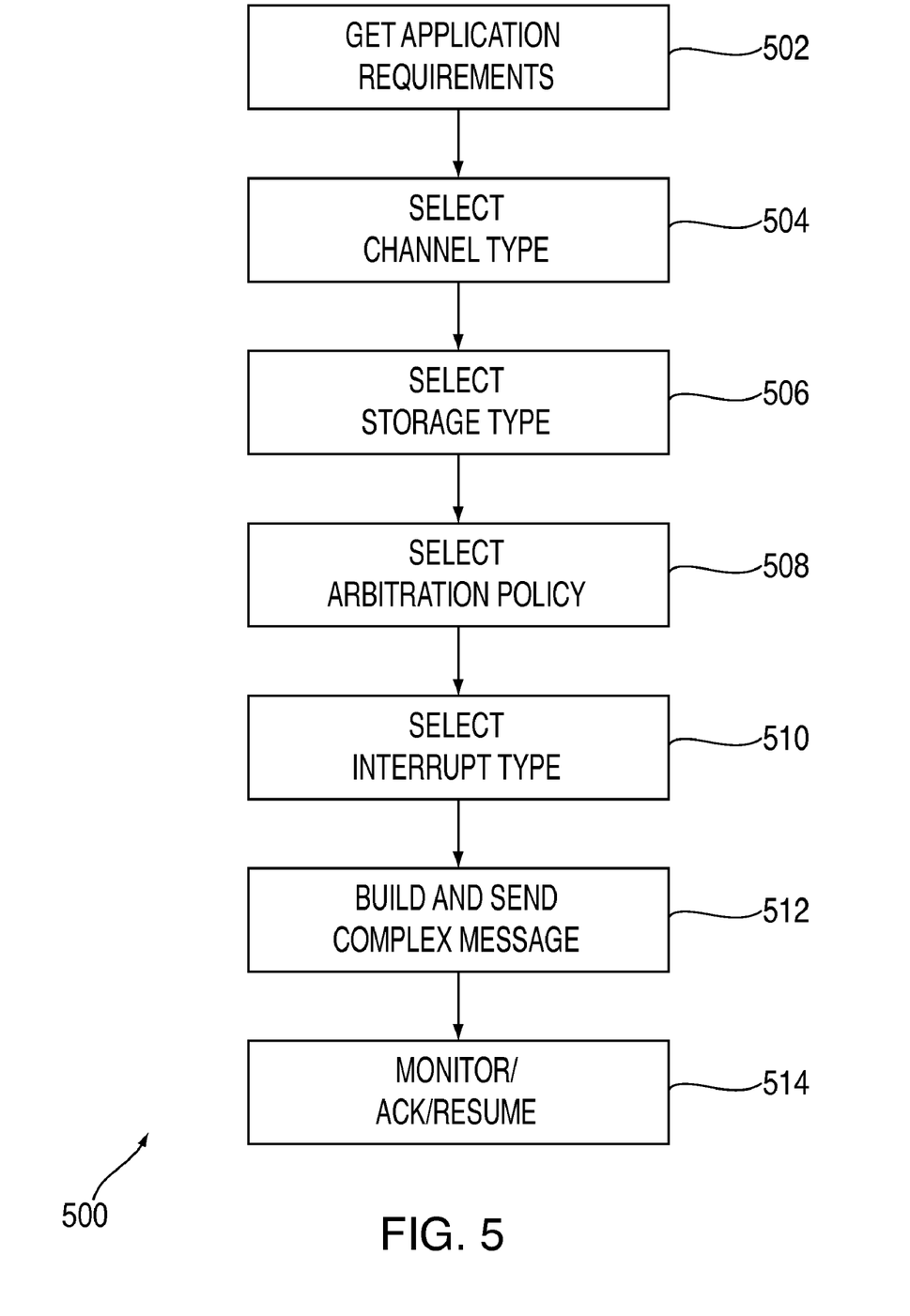
FIG. 5 illustrates a semaphore storage unit multi-way real-time message passing protocol for a sending functional unit in accordance with yet another embodiment of the present disclosure.

Referring now to FIGS. 2, 4, and 5, a sending semaphore storage unit multi-way real-time message passing protocol 500 is illustrated. It should be noted that the following discussion relates to SSU 250 for illustrative purposes. However, the following discussion is also applicable to SSU 350, or any other SSU, while keeping within the spirit and scope of the present disclosure. Protocol 500 provides a protocol for moving semaphore data from one natural semaphore location to another natural semaphore location from the perspective of the sending functional unit or semaphore storage unit.

At 502, functional unit 210 and/or SSU 250 may receive application requirements for performing specific applications, programs, or processes by a system, such as system 200. The application requirements may include a set of communication primitives for each traffic scenario between plurality of functional units 210, 310.

At 504, functional unit 210 and/or SSU 250 may select a channel type for communications or a communications channel based on the application requirements between the devices of system 200 by transferring messages and data, including but not limited to semaphore data. In other words, the channel type for communications or communications channel is programmed to support communication of semaphore data between the plurality of functional units from natural semaphore locations over network 220.

At 506, SSU 250 may select a storage type or programmable memory locations as the natural semaphore location for locating and/or holding semaphore data, the shared resource. SSU 250 may determine the natural semaphore location where semaphore data may reside in system 200 for accessing semaphore data based on the requirements and constraints of the specific program, application, or process via the application requirements provided at 502. The storage type selected may be based on factors such as, but not limited to, which functional units 210 are performing the greatest number of calculations, which devices are used the most such that the semaphore is located physically close to these devices, and so forth.

At 508, SSU, such as SSU 250 or SSU 350, may select an arbitration policy for controlling access to the semaphore data at the natural semaphore locations by the plurality of functional units and/or plurality of programmable memory locations. The arbitration policy may set out a hierarchy for accessibility of the semaphore data since semaphore data may generally be accessed by only one device at a time. Additionally, the arbitration policy may determine locations for natural semaphore locations within system 200 based on the application requirements and available devices.

At 510, SSU 250 may select an interrupt type policy for stopping and starting access to the semaphore data at the natural semaphore location or locations by the plurality of functional units. The interrupt type policy generally provides policy criteria for interrupting the arbitration policy for accessing and dynamically moving the semaphore data between natural semaphore locations. For example, the interrupt type policy may set a hierarchy for one device to have priority over another device, which may be next in line or even accessing the semaphore data. In another example, the arbitration policy and interrupt type policy may determine the natural semaphore location to be at one location during a first thread of a program, and then determine the natural semaphore location to be at another location during a second thread of the program. Accordingly, the interrupt policy may provide guidelines to ensure that certain devices have priority access to the semaphore data at the natural semaphore location according to the application requirements. Moreover, the interrupt policy may provide guidelines for determining and dynamically moving the natural semaphore location for semaphore data within system 200 working with the arbitration policy and application requirements.

At 512, a complex message may be built or produced from semaphore data to be sent to functional units or other devices requiring access to the semaphore data by associating the application requirements and the plurality of programmable memory locations with the required communication primitives. The complex message may then be sent to the appropriate functional unit such as functional units 210, 310 or other devices per the application requirements, interrupt type policy, and arbitration policy, over network 220.

At 514, SSU 250 monitors all complex messages 400 sent to and from the SSU and access to semaphore data by functional units and devices at the natural semaphore locations within system 200, such as traffic scenarios between the plurality of functional units over network 220 by the SSU. SSU 250 verifies decoding and acknowledgments of sent complex messages to ensure proper delivery and execution by appropriate associated functional units 210, 310 via application of the channel type or communications channel. The process then continues to build and send complex messages per the application requirements and arbitration policy until system 200 resets, interrupts, or ends.

Figure 6:
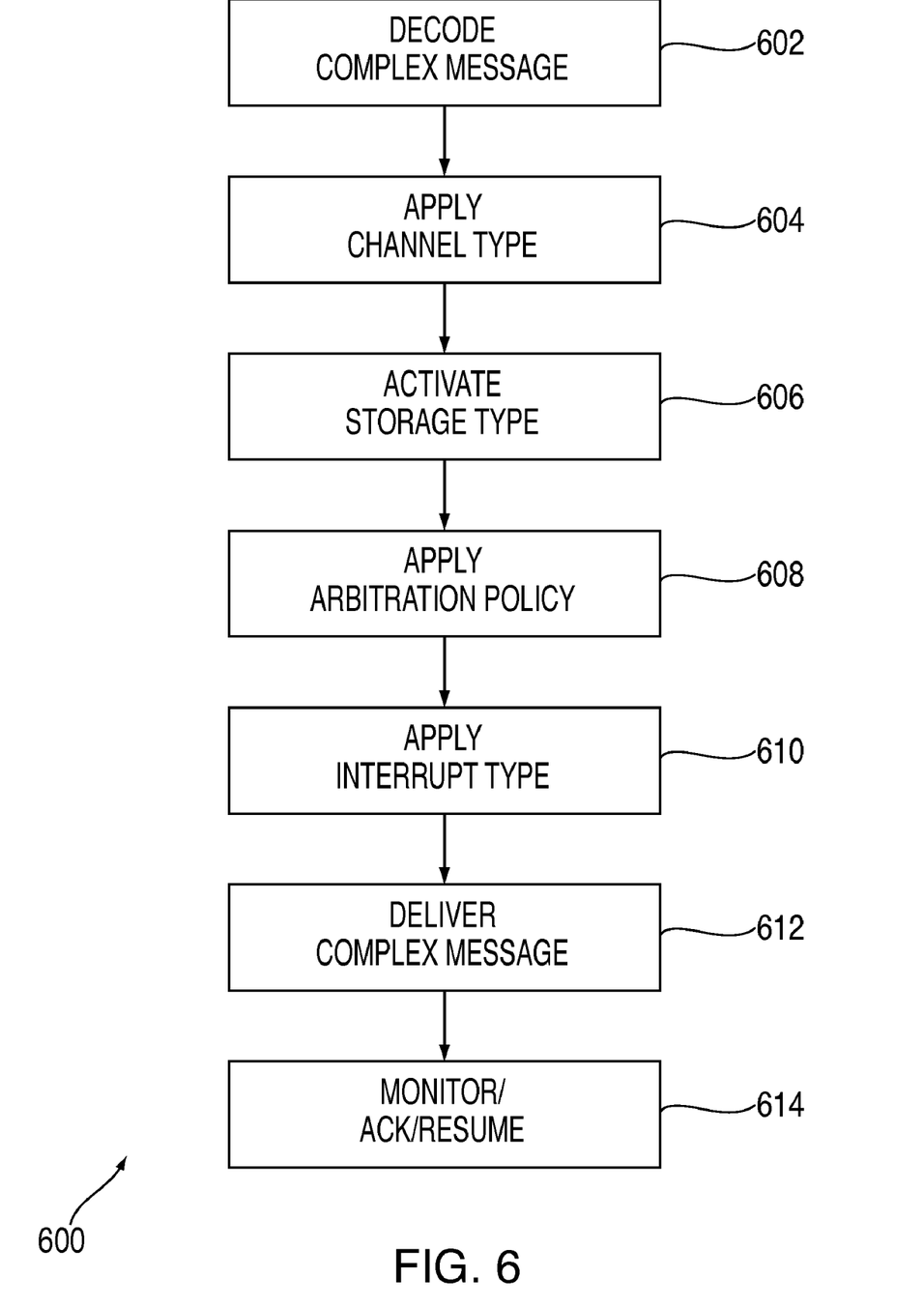
FIG. 6 illustrates a semaphore storage unit multi-way real-time message passing protocol for a receiving functional unit in accordance with still yet another embodiment of the present disclosure.

Referring to FIGS. 2, 4, and 6, a receiving semaphore storage unit multi-way real-time message passing protocol 600 is illustrated (FIG. 6). It should be noted that the following discussion relates to SSU 350 for illustrative purposes only. However, the following discussion is also applicable to SSU 250, or any other SSU, while keeping within the spirit and scope of the present disclosure. Protocol 600 provides a protocol for moving semaphore data from one natural semaphore location to another natural semaphore location from the perspective of the receiving functional unit or semaphore storage unit. Additionally, the present disclosure also contemplates a plurality of natural semaphore locations in system 200 while keeping within the spirit and scope of the present disclosure.

At 602, functional unit 210 and/or SSU 350 may receive and decode the complex message from the sending functional unit or sending SSU, such as SSU 250.

At 604, functional unit 210 and/or SSU 350 may apply the channel type for communications with at least one of the storage device and/or plurality of programmable memory locations holding the semaphore data at the natural semaphore location or locations.

At 606, SSU 350 activates the at least one of the storage device and/or plurality of programmable memory locations at the natural semaphore location or locations to allow access to the semaphore data from the shared resource.

At 608, functional units 210 and/or SSU 350 may apply the arbitration policy for accessing the semaphore data and associated hierarchy for accessibility to the semaphore data. Additionally, the arbitration policy may provide natural semaphore locations within system 200 based on the arbitration policy, the application requirements, available programmable memory locations, and available devices.

At 610, functional units 210, 310 may apply the interrupt type policy for accessing the semaphore data and interrupting the arbitration policy for accessing the semaphore data. As provided above, the interrupt type policy provides policy criteria for interrupting the arbitration policy for accessing and/or dynamically moving the semaphore data between natural semaphore locations during threads of a program or application.

At 612, functional unit 210, 310 receives complex message of semaphore data from the natural semaphore location or locations to be sent to the functional unit or other device requiring access to semaphore data. Complex message may be sent to the appropriate functional units 210, 310 or other device per the application requirements, the arbitration policy, and the interrupt type policy.

At 614, functional units 210, 310 may send acknowledgment that the complex messages were properly delivered and executed to the sending SSU. The process then continues to send and receive complex messages per the application requirements, the arbitration policy, and the interrupt type policy until system 200 is reset, interrupted, or ends.

Figure 7:
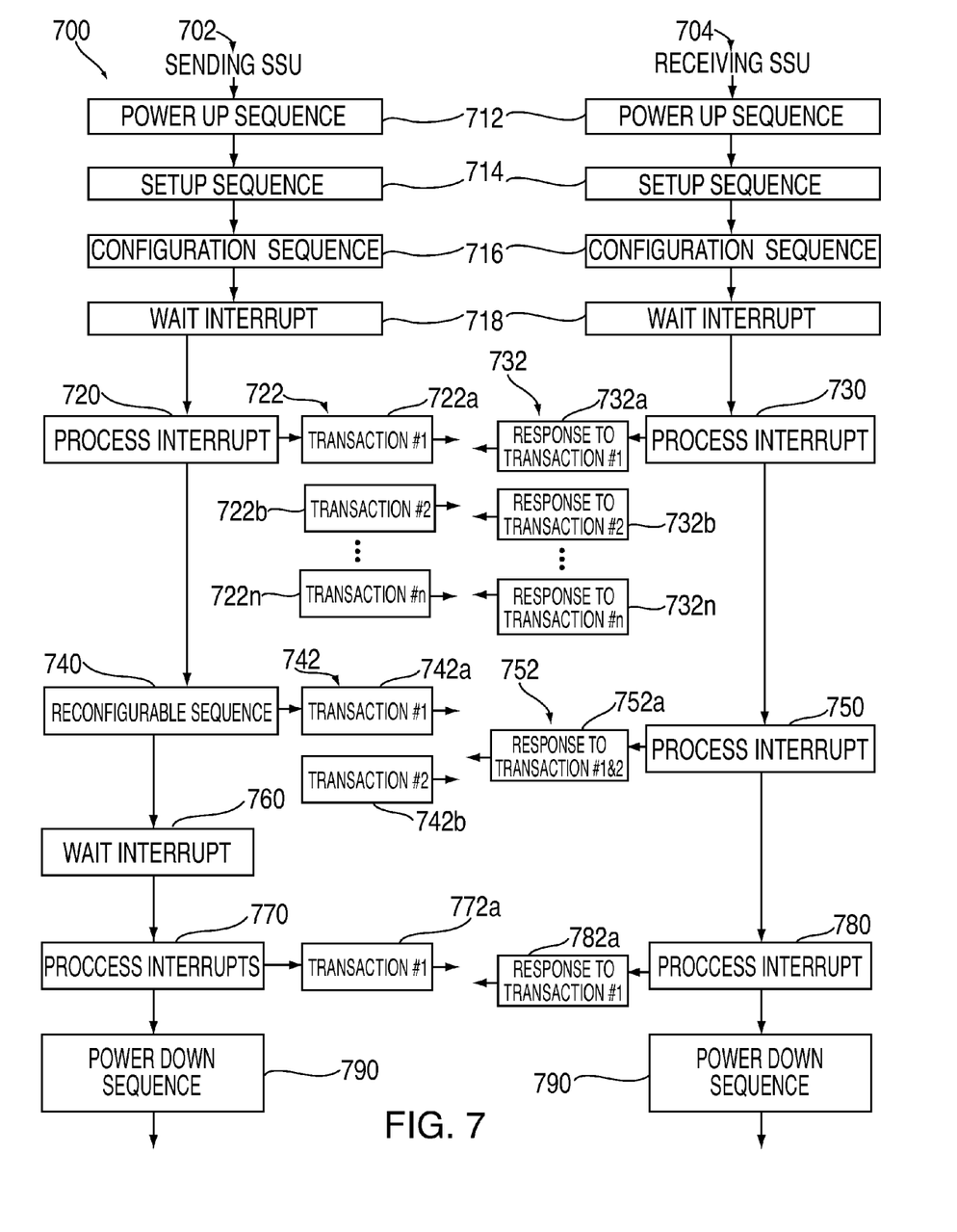
FIG. 7 illustrates a SSU operations flow diagram.

Referring to the illustrative embodiments in FIGS. 2, 4, and 7, FIG. 7 illustrates an operations flowchart 700 for SSUs, such as SSU 250 and 350, from power-up to power-down. Flowchart 700 includes a sending side 702 and a receiving side 704. Sending side 702 provides a flow diagram for sending messages from the sending SSU, such as SSU 250. Receiving side 704 provides a flow diagram for receiving messages from the receiving SSU, such as SSU 350. Sending and receiving SSUs may map programmable communication resources to a complex message passing interface requirement based on application specifications.

At 712, sending SSU 250 and receiving SSU 350 may both perform a power-up sequence, where each SSU powers up along with the functional units and other devices of system 200.

At 714, sending SSU 250 of first side 702 and receiving SSU 350 of second side 704, may each perform a setup sequence to determine a topology and an architecture of devices in system 200. For example, SSU 250 may determine which programmable resources are available for inter-functional unit communications over network 220.

At 716, both sides 702 and 704 may perform a configuration sequence for configuring the parameters of devices in system 200. For example, a set of communication primitives for each traffic scenario between plurality of functional units 210, 310 of system 200 may be provided and configured in the functional units and SSUs 250, 350. Additionally, SSUs 250, 350 may provide a virtual programming model with a logical to physical translation of portioned global and local register access for on-demand response to system events.

At 718, SSUs of sides 702 and 704 may both wait for a wait interrupt event to occur. Generally, SSUs may wait for a fixed amount of time that may be standard or user-defined. If the time expires, flowchart 700 may either continue to wait or continue along flowchart 700.

At 720 of sending side 702, sending SSU may receive a process interrupt message informing the associated sending SSU to interrupt the program process and/or dynamically move the semaphore data to another natural semaphore location.

At 722, sending SSU may send out transactions to functional units. Transactions are identified as 722a, 722b, 722n, and so on, and may be requests in the program or application from SSUs, system 200, a user of the system, and any combinations thereof. Additionally, the present disclosure provides the use of high-level transaction types that may be mapped by SSU to fixed-block transfers, variable-block transfers, split-transactions, and atomic transfers and/or mapped to more flexible, high performance, and more scalable transfer types including packet-based transfers, pipelined transfers, interrupt-driven transfers with less number of pins, less handshaking transactions, and reduced latencies.

At 730 of receiving side 704, receiving SSU may receive the process interrupt message. Receiving SSU receives first transaction 722a from sending SSU. Receiving SSU then responds with a response to first transaction 732a. Likewise, receiving SSU receives second transaction 722b and responds with a response to second transaction 732b, and so on.

At 740, sending SSU performs a reconfigurable sequence which may include reconfiguration after the natural semaphore location has been dynamically moved. Sending SSU then sends out a first transaction message 742a, a second transaction message 742b, and so on. Transaction messages 742 may provide the reconfigurable sequence for dynamically changing the natural semaphore location of semaphore data within system 200.

At 750, receiving SSU may receive another process interrupt signal. In this illustrative embodiment, receiving SSU may receive both first transaction message 742a and second transaction message 742b. Receiving SSU then may respond to both first transaction message 752a and second transaction message 752b with a response to first and second transaction messages 752a.

At 760, sending SSU may wait for another interrupt event in the program on sending side 702.

At 770, sending SSU may experience another process interrupt and may send out a first transaction 772a.

At 780, receiving SSU may receive the process interrupt message. Then, receiving SSU may receive first transaction 772a from sending SSU. Receiving SSU then may respond with a response to first transaction 782a.

At 790, when the process has been completed, stopped, reset, or turned off, both the sending and receiving SSUs will perform a power-down sequence.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for managing semaphore data, the system comprising:
    a network;
    a plurality of functional units communicating over said network, said plurality of functional units including a plurality of functional unit memory locations;
    a memory device communicating with said plurality of functional units over said network, said memory device including a plurality of memory device memory locations; and
    at least one semaphore storage unit communicating with said plurality of functional units and said memory device over said network, said at least one semaphore storage unit including a plurality of semaphore storage unit memory locations;

wherein said at least one semaphore storage unit controls dynamic movement of the semaphore data, said at least one semaphore storage unit retrieving the semaphore data from an initial location and placing the semaphore data in a first semaphore data location determined by said at least one semaphore storage unit using a semaphore-mapped protocol based on at least one application requirement; and wherein said at least one semaphore storage unit moves the semaphore data from said first semaphore data location to a second semaphore data location among said plurality of functional unit memory locations, said plurality of memory device memory locations, said plurality of semaphore storage unit memory locations, and any combinations thereof.

2. The system according to claim 1, wherein said network, said plurality of functional units, said memory device, and said at least one semaphore storage unit reside on an integrated circuit chip.

3. The system according to claim 1, wherein each of said plurality of functional units comprises a processor.

4. The system according to claim 1, wherein said plurality of functional unit memory locations comprise at least one of: a register, a cache, and any combinations thereof.

5. The system according to claim 1, wherein said plurality of memory device memory locations comprise at least one of: a memory-mapped device, a shared memory device, a distributed memory device, a hard drive, a RAM, a SRAM, and any combinations thereof.

6. The system according to claim 1, wherein said plurality of semaphore storage unit memory locations comprise a virtual storage array.

7. The system according to claim 6, wherein said virtual storage array includes at least one of: a RAM, a SRAM, a stats table, a routing table, and any combinations thereof.

8. An interrupt free communication system for managing semaphore data having a value and an initial location, the semaphore data accessible by a plurality of functional units of the system, the semaphore storage unit comprising:

a programmable processor interface interfacing with the plurality of functional units of the system;

a semaphore storage unit memory device;

a memory controller controlling said memory device;

a programmable on-chip network interface interfacing with a network of the system; and a semaphore controller dynamically controlling the location of the semaphore data, wherein the location is determined using a semaphore-mapped protocol based on at least one application requirement, -and automatically communicating to the plurality of functional units of the system the value and a new location of the semaphore data.

9. The semaphore storage unit according to claim 8, wherein said semaphore storage unit memory device comprises a virtual storage array.

10. The semaphore storage unit according to claim 9, wherein said virtual storage array includes at least one of: a RAM, a SRAM, a stats table, a routing table, and any combinations thereof.

11. The semaphore storage unit according to claim 8, wherein said semaphore storage unit memory device includes at least one of: a register, a cache, an on-chip memory, a tightly-coupled memory, and any combinations thereof; and said memory controller includes at least one of: an associated cache controller, an associated on-chip memory controller, an associated tightly-coupled memory controller, and any combinations thereof.

12. The semaphore storage unit according to claim 8, further comprising a bus master port and a bus slave port.

13. The semaphore storage unit according to claim 8, further comprising an elastic interface queue.

14. The semaphore storage unit according to claim 8, further comprising a real-time interruptible controller.

15. The semaphore storage unit according to claim 8, further comprising a peer-to-peer bus controller for enabling communications with a plurality of bus topologies, and a peer-to-peer switch controller.

16. The semaphore storage unit according to claim 8, further comprising a high-level arbiter controller, a traffic monitor controller, and any combinations thereof.

17. A method of repositioning semaphore data from a first location to a natural location in a system for managing semaphore data for sharing by a plurality of functional units of the system, the system including a semaphore storage unit, a plurality of programmable memory locations, and a network over which the plurality of functional units can communicate with the plurality of programmable memory locations, the network including a communications channel that supports communication of semaphore data between the plurality of functional units and the plurality of programmable memory locations over the network, the method comprising:

receiving application requirements at the semaphore storage unit, said application requirements including a set of communication primitives for each traffic scenario between the plurality of functional units;

programming the communications channel based on the application requirements to support communication of semaphore data between the plurality of functional units over the network;

selecting said natural location from at least one of the plurality of programmable memory locations to receive semaphore data based on the application requirements;

associating the application requirements and the programmable memory locations with the required communication primitives to produce a complex message from semaphore data; and sending the complex message to at least one functional unit over the communications channel of the network according to the application requirements.

18. The method according to claim 17, the method further comprising:

receiving the complex message by the at least one functional unit;

decoding the complex message by the at least one functional unit;

applying a channel type from the complex message to access the semaphore data at said natural location;

activating at least one of the programmable memory locations to access the semaphore data by the at least one functional unit;

acknowledging receipt of complex message by the at least one functional unit to the semaphore storage unit; and delivering an acknowledgement message to the semaphore storage unit.

19. The method according to claim 17, the method further comprising:

applying an arbitration policy for controlling access to and from the plurality of the programmable memory locations by the plurality of functional units; and applying an interrupt type policy for stopping and starting access to the plurality of programmable memory locations by the plurality of functional units.

20. The method according to claim 17, further comprising:

monitoring traffic scenarios between the plurality of functional units over the network by the semaphore storage unit;

sending an acknowledgement message to the semaphore storage unit of proper receipt of the complex message; and acknowledging receipt of the complex message by the plurality of functional units over the network to the semaphore storage unit.

* * * * *